Dec. 16, 1958 A. L. FRALEIGH 2,864,275
MUSICAL EDUCATIONAL BOARD
Filed July 14, 1954
Fig. 1
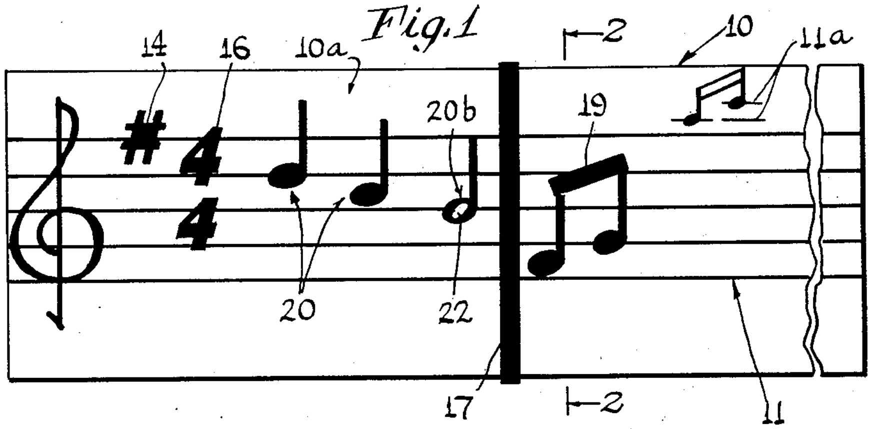
Fig. 2
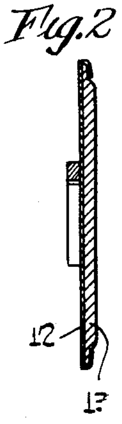
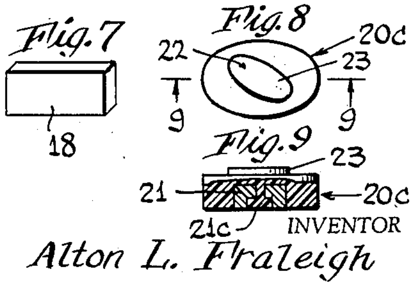
Fig. 10
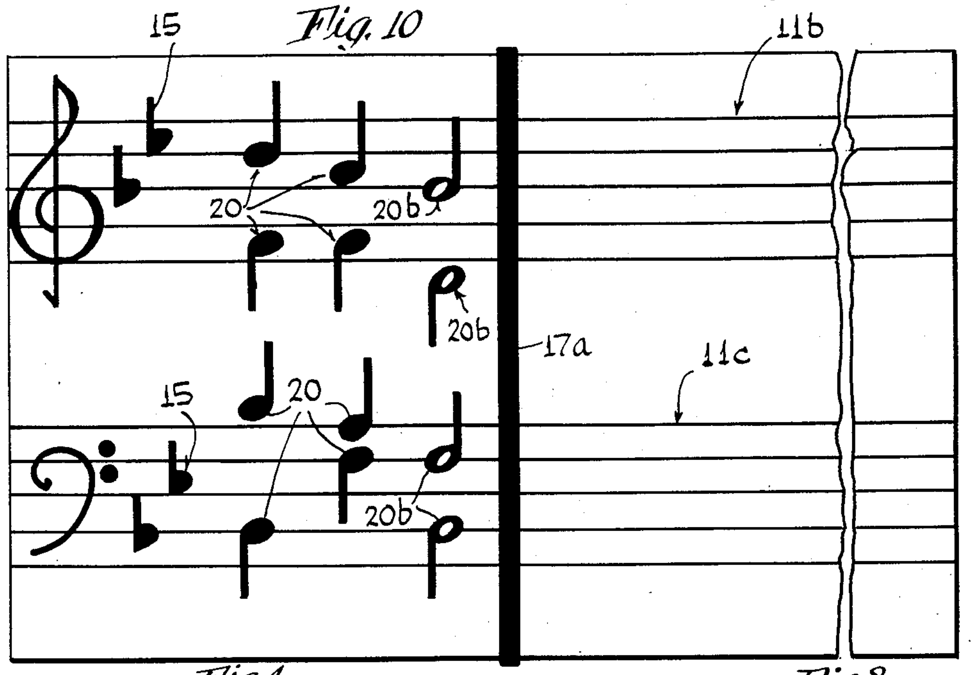
Fig. 3, Fig. 4, Fig. 5, Fig. 6
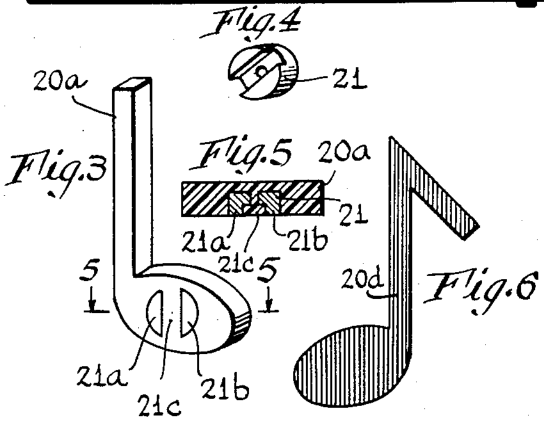
Fig. 7, Fig. 8, Fig. 9
INVENTOR
Alton L. Fraleigh
BY Johnson and Kline
ATTORNEYS 2,864,275

MUSICAL EDUCATIONAL BOARD

Alton L. Fraleigh, Norwalk, Conn.

Application July 14, 1954, Serial No. 443,270

1 Claim. (Cl. 84—471)

The present invention relates to an educational device and more particularly to a device to facilitate the teaching of music.

It has long been a problem of providing an effective means for teaching music, particularly to young children, since it is difficult to hold the child's attention to explanations utilizing printed music and it has also been difficult to have the children realize the fact that the various notes and symbols are, in effect, entities which go to build up scales, tunes and the like.

The present invention overcomes these difficulties by providing a teaching means in which the notes and other musical symbols can be readily moved around on the staff during the explanation of their function and in which the notes and symbols separate elements become entities which can be handled by the child, lending realism to the realization of the components making up written music.

This is accomplished by providing a base in the form of a sheet of magnetizable material having on the surface thereof predeterminately spaced lines forming musical staffs and by providing separate, individual musical symbols and notes which are adapted to be placed on the staff for the purpose of teaching the formation and reading of music.

In the present preferred form of the invention the notes and symbols are formed of non-magnetic material, preferably of a molded rubber or other plastic material, and have embedded therein, so as to be exposed in the underface only thereof, relatively small permanent magnets which act, when the note is placed in position on the base, to hold the note thereto by magnetism, yet will readily permit the note to be moved about on the base in predetermined relation to the staff as required.

A feature of the invention resides in the fact that the non-magnetic upper surface of the note will prevent the note from being applied to the board in a reverse position as might be done by a young child inexperienced in music.

If desired, the top surface of the base forming the background for the staff can be of a hard, durable surface capable of having inscriptions made thereon by crayon, chalk, pencil or any other suitable removable inscribing medium which might be used to mark on the base instructions and/or symbols, such as the letters of the scale or other similar means, to aid in the teaching. Also, the notes can have their outer surface formed with a distinctive color so that they will stand out against the base.

The present invention is not limited to instruction for children but can be adapted for advanced study by having the base enlarged to include treble and bass staffs and the notes and symbols applied thereto to facilitate advanced instruction in harmony and the like.

Other features and advantages of the invention will be apparent from the specification and claim when considered in connection with the drawings in which:

Figure 1 shows a plan view of one form of the invention.

Fig. 2 is a sectional view taken along line 2—2 of Fig. 1.

Fig. 3 shows a perspective view of a note showing the undersurface thereof.

Fig. 4 is a perspective of the magnet member.

Fig. 5 is a sectional view along line 5—5 of Fig. 3 showing the magnet imbedded in the note.

Fig. 6 shows a note having a distinctively colored face.

Fig. 7 shows a rest bar.

Fig. 8 shows a whole note.

Fig. 9 is a section taken along line 9—9 of Fig. 8.

Fig. 10 shows a board of the present invention having a treble and bass staff thereon.

In carrying out the present invention a base 10 of magnetizable material is provided on its face with spaced lines 11 of distinctive color forming a musical staff. The top surface of the base is continuous, thereby permitting notes or symbols to be properly located either on the lines or on the spaces between the lines of the staff. While the base may be constructed in many ways, in the present preferred form of the invention the face is formed from a flat thin sheet metal member 12 having a layer of compressible material such as corrugated cardboard 13 overlying the back thereof with the edges of the member folded over and crimped down tight on the edges of the cardboard.

It will be seen in Fig. 2 that as the edges are crimped down they will compress the edge of the cardboard leaving a projecting pad of cardboard centrally of the base whereby the device can be laid on a desk or other surface without scratching the same.

For the purpose of illustrating and teaching music suitable symbols such as sharps 14, flats 15, time indicator numerals 16, measure bars 17, rests 18, and building bars 19 for building 8th or 16th notes, and notes 20 which may range from whole notes to 16th notes are provided as required. These symbols are preferably flat, thin and lightweight and are adapted to be movably and removably mounted on the face, and are so constructed that they cannot be reversed and improperly applied to the board as might be done by a young child or a person unfamiliar with music. This is accomplished by providing the symbols with a magnetic means exposed only on the lower face capable of holding the symbol on the base and with a non-magnetic upper face which will not hold if the note is applied in a reversed position.

While the upper face can be made as a layer of non-magnetic material, in the preferred form of the invention the whole symbol is formed of a non-magnetic plastic material. This is clearly shown in Figs. 3 to 5 wherein a quarter note 20*a* is shown in detail. The note, which is relatively thin and flat, is preferably molded in a single piece and has a magnet 21 as shown in Fig. 4 embedded therein with the pole faces 21*a*, 21*b* exposed in the plane of the underface so as to cooperate with the base to releasably hold the note on the base and with the plastic material extended across and interlocked with the bridge 21*c* of the magnet to prevent it from becoming inadvertently separated from the symbol. Since the plastic material is relatively light, small magnets may be used to effectively hold the symbols in place. This is of advantage since it reduces the cost and also permits small symbols such as rests 18 and the like to be employed, which have proper proportions to the other musical symbols. In the case of half notes 20*b* or whole notes 20*c* in which an oval center 22 is provided, this can be formed by a distinctively colored insert or a layer 23 of paper, paint, or other suitable material on the top surface thereof, as shown in the whole note 20*c* in Figs. 8 and 9.

It is at present preferred to form the background surface 10*a* of the base of a light color so that the staff lines stand out prominently and to make the notes and other symbols of a dark material, preferably black, so that they can be best seen by the students. If desired, however, the notes can be or have their upper surfaces of distinctive colors such as, for example, the red upper surface on the eighth note 20*d* in Fig. 6 to aid in distinguishing notes.

The surface 10*a* may be of such a character that it can have indicia or instructions such as, for example, the letters denoting the lines and spaces of the staff or other similar information provided thereon by means of chalk, crayon or the like, removable inscribing material and function similar to a blackboard, which inscriptions can be readily removed as required.

The base as shown in Fig. 1 extends beyond the staff so that if desired ledger lines 11*a* can be provided above or below the staff to accommodate notes. The ledger lines 11*a* can be applied with inscribing material, by colored adhesive tape or any other suitable means.

In using the present invention for teaching, the readily removable symbols can be handled and discussed as entities and the function that each performs can be explained. Then, by using these entities as building blocks, it can be shown how each plays a part in the formation of music.

I have discovered that this device, which is relatively inexpensive to manufacture and easy to operate, will attract and hold the attention of very young children as well as those who are not musically inclined so as to greatly facilitate the teaching of music in schools and the like.

If it is desired to use the present invention to teach advanced music, the base 10 is enlarged as shown in Fig. 10 so as to have a treble staff 11*b* and a bass staff 11*c* thereon, and measure bars 17*a* are of a length capable of extending over both staffs and are employed to divide the staffs into proper measures. With this arrangement, the symbols can be similarly used to teach the building up of chords and harmonies.

Variations and modifications may be made within the scope of the claim and portions of the improvements may be used without others.

I claim:

In an educational device for musical instruction, a base comprising a thin sheet of magnetically attractable material having a layer of protective material overlying the back and having the base overlying the edge of the layer with the center portion of said layer projecting from the base below said overlying edge and adapted to prevent the sheet of magnetically attractable material from engaging and marring the surface on which the device is supported, said projecting portion of said layer terminating short of the edges of the sheet whereby the fingers can be inserted under the edge of the sheet to facilitate handling of the device, the front surface of the base having a representation of a staff thereon, and musical symbols having magnetic means therein and exposed only on the under surface thereof movably mounted on said representation of a staff.

References Cited in the file of this patent

UNITED STATES PATENTS

| | | |
|---|---|---|
| 240,027 | Jones | Apr. 12, 1881 |
| 251,167 | Bidelman | Dec. 20, 1881 |
| 1,433,850 | Schnitker | Oct. 31, 1922 |
| 1,531,070 | Bruns | Mar. 24, 1925 |
| 1,879,002 | Alles | Sept. 27, 1932 |
| 2,144,184 | Hale et al. | Jan. 17, 1939 |
| 2,254,498 | Scharf | Sept. 2, 1941 |
| 2,330,951 | Burmester et al. | Oct. 5, 1943 |
| 2,643,466 | Bucher | June 30, 1953 |

FOREIGN PATENTS

| | | |
|---|---|---|
| 120,485 | Germany | May 10, 1910 |